---

United States Patent Office 2,960,429
Patented Nov. 15, 1960

---

2,960,429

BUTYNYL PHOSPHOROTHIOATES

Joseph W. Baker, Kirkwood, and John P. Chupp, St. Louis, Mo., and George A. Saul, Nitro, W. Va., assignors to Monsanto Chemical Company, St. Louis, Mo., a corporation of Delaware No Drawing. Filed Sept. 8, 1958, Ser. No. 759,408

13 Claims. (Cl. 167—22)

This invention relates to new organic compounds of phosphorus and methods of making them. More particularly, the invention relates to butynyl phosphorothioates having the structure

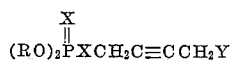

where R is an alkyl radical, X is a chalkogen of atomic weight less than 40 and Y is halogen or preferably

wherein X and R are the same as above. Examples of R are methyl, ethyl, propyl and isopropyl. The halogen is preferably a middle halogen but may be fluorine or iodine. These compounds are valuable insecticides. Where Y is halogen the compounds are also valuable intermediates for making other phosphorothioates.

The new compounds of this invention may conveniently be prepared by reacting a dihalogen substituted butyne with a salt of a phosphorothioic acid. The proportions of reactants will vary depending upon the product desired. For the preparation of the bis(dialkyl phosphorothioates) at least two molecular proportions of the acid salt are reacted with one molecular proportion of the dihalobutyne. Equal molecular proportions are reacted to replace only one halogen substituent.

The following examples illustrate the general procedure without limiting the scope of the invention.

*Example 1*

In a suitable reactor was placed 19.7 grams (0.16 mole) of 1,4-dichlorobutyne-2 and 150 ml. of acetone. After the mixture had been heated to 35° C., 28.0 grams (0.15 mole) of ammonium O,O-diethyl phosphorothioate in 100 ml. of acetone was slowly added. The product was stirred for 7 hours at 35–40° C., cooled and filtered. The filtrate was stripped of acetone, washed once with water and then stripped to a maximum temperature of 100° C. at 5 mm. pressure. The desired S-(4-chloro-2-butynyl) O,O-diethyl phosphorothioate was obtained in theory yield as a dark amber liquid. It analyzed 11.7% phsphorous, 12.2% chlorine and 11.9% sulfur as compared to calculated values of 12.1% phosphorus, 13.8% chlorine and 12.4% sulfur.

*Example 2*

In the procedure of Example 1, 30.4 grams (0.15 mole) of ammonium O,O-diethyl phosphorodithioate was substituted for the monothioate. The desired S-(4-chloro-2-butynyl) O,O-diethyl phosphorodithioate was obtained in 97.5% yield as a dark amber liquid. Analysis gave 11.3% phosphorus and 12.5% chlorine as compared to values calculated of 11.3% phosphorus and 13.0% chlorine.

*Example 3*

To 39.3 grams (0.21 mole) of ammonium O,O-diethyl phosphorothioate dissolved in 120 ml. of acetone was slowly added with stirring 12.3 grams (0.1 mole) of 1,4-dichlorobutyne-2. The mixture was heated to reflux for 3 hours, cooled and filtered. The filtrate was stripped to 90° C. at 5 mm. pressure and dissolved in benzene. An additional 10 grams of the acid salt were added and the product heated for 3 hours. It was then filtered, washed and stripped of solvent. The S,S'-(2-butyne-1,4-dithiol) bis(O,O-diethyl phosphorothioate) was obtained as an amber liquid. Analysis gave 14.9% phosphorus as compared to 15.8% calculated.

*Example 4*

To 40.6 grams (0.2 mole) of ammonium O,O-diethyl phosphorodithioate in 100 ml. of benzene was added 12.3 grams (0.1 mole) of 1,4-dichlorobutyne-2. The mixture was refluxed at 80° C. for 3 hours, cooled and filtered. The filtrate was washed and stripped to 100° C. at 5 mm. pressure. The S,S'-(2-butyne-1,4-dithiol) bis(O,O-diethyl phosphorodithioate) was obtained as a brown liquid. It analyzed 13.9% phosphorus and 28.4% sulfur as compared to calculated values of 14.7% phosphorus and 30.4% sulfur.

*Example 5*

To 87.5 grams (0.5 mole) of ammonium O,O-dimethyl phosphorodithioate in 150 ml. of acetone was added 24.6 grams (0.2 mole) of 1,4-dichlorobutyne-2. The mixture was refluxed for 8 hours, filtered and the filtrate stripped of solvent. The product was then dissolved in methylene chloride, washed with water and stripped to a maximum temperature of 110° C. at 10 mm. pressure. The desired S,S'-(2-butyne-1,4-dithiol) bis(O,O-dimethyl phosphorodithioate) was an amber liquid.

*Example 6*

To 24.6 grams (0.2 mole) of 1,4-dichlorobutyne-2 in 100 ml. of acetone was added 37.4 grams (0.2 mole) of ammonium O,O-diethyl phosphorothioate and the mixture refluxed for 2 hours. Upon cooling there was added 40.6 grams (0.2 mole) of ammonium O,O-diethyl phosphorodithioate and the mixture refluxed for an additional 2 hours. It was then cooled, filtered and the salt cake washed with more acetone. The combined filtrate and washings were stripped of acetone and washed with 150 ml. of water. The product was dissolved in 100 ml. of methylene chloride, washed again with 250 ml. of water and the organic layer stripped of solvent and moisture by heating to 100° C. at 5 mm. The desired S,S'-(2-butyne-1,4-dithiol) O,O-diethyl phosphorothioate O,O-diethyl phosphorodithioate was an amber liquid analyzing 14.4% phosphorus and 24.5% sulfur as compared to calculated values of 15.2% phosphorus and 23.6% sulfur.

The compounds of this invention can be employed for insecticidal purposes by the use of any of the methods which are conventionally employed in the art. For example, the compound can either be sprayed or otherwise applied in the form of a solution or dispersion, or it can be mixed with a finely divided solid carrier and applied as a dust. Adjuvants, such as dispersing and wetting agents, can also be included in the compositions. Examples are soft or hard sodium or potassium soaps, alkylated aromatic sodium sulfonates such as sodium dodecylbenzene sulfonate, or an amine salt of dodecylbenzene-sulfonic acid, alkali metal salts of sulfated fatty alcohols, ethylene oxide condensation products of alkyl phenols or tall oil. Solid carrier materials which can be employed include talc, clay, pyrophyllite, silica and similar inert solid diluents. Sprays for application to agricultural crops may suitably be applied at concentrations of 0.001 to 1.0% Employing a concentration of 10 p.p.m. of the active ingredient, 100% kill of the yellow fever mosquito larvae was noted with the products of Examples 1, 2, 3, 4, 5 and 6. A kill of 90% of the same test insect was also obtained with preparations containing 0.04 p.p.m. of the products of Examples 2 and 4 while 100% kills were obtained from 0.31 p.p.m. of the product of Example 5 and from 0.15 p.p.m. of the product of Example 6.

It is intended to cover all changes and modifications of the examples of the invention herein chosen for purposes of disclosure which do not constitute departures from the spirit and scope of the invention.

What is claimed is:

1. A compound of the structure $$(RO)_2\overset{X}{\overset{\|}{P}}XCH_2C\equiv CCH_2Y$$

where R is a lower alkyl radical, X is a chalkogen of atomic weight less than 40 and Y is a member of the class of radicals consisting of chlorine and $$X\overset{X}{\overset{\|}{P}}(OR)_2$$

wherein X and R are as set forth above.

2. A compound of the structure $$(RO)_2\overset{X}{\overset{\|}{P}}XCH_2C\equiv CCH_2X\overset{X}{\overset{\|}{P}}(OR)_2$$

where R is a lower alkyl radical and X is a chalkogen of atomic weight less than 40, at least one of which is sulfur.

3. A compound of the structure $$(RO)_2\overset{X}{\overset{\|}{P}}XCH_2C\equiv CCH_2Y$$

where R is a lower alkyl radical, X is a chalkogen of atomic weight less than 40, at least one of which is sulfur, and Y is chlorine.

4. A compound of the structure $$(C_2H_5O)_2\overset{S}{\overset{\|}{P}}SCH_2C\equiv CCH_2Cl$$

5. A compound of the structure $$(C_2H_5O)_2\overset{O}{\overset{\|}{P}}SCH_2C\equiv CCH_2Cl$$

6. A compound of the structure $$(C_2H_5O)_2\overset{S}{\overset{\|}{P}}SCH_2C\equiv CCH_2S\overset{S}{\overset{\|}{P}}(OC_2H_5)_2$$

7. A compound of the structure $$(C_2H_5O)_2\overset{O}{\overset{\|}{P}}SCH_2C\equiv CCH_2S\overset{O}{\overset{\|}{P}}(OC_2H_5)_2$$

8. A compound of the structure $$(CH_3O)_2\overset{S}{\overset{\|}{P}}SCH_2C\equiv CCH_2S\overset{S}{\overset{\|}{P}}(OCH_3)_2$$

9. A compound of the structure $$(C_2H_5O)_2\overset{S}{\overset{\|}{P}}SCH_2C\equiv CCH_2S\overset{O}{\overset{\|}{P}}(OC_2H_5)_2$$

10. The process which comprises reacting substantially equal molecular proportions of 1,4-dichlorobutyne-2 and a salt of an acid having the structure $$(RO)_2\overset{X}{\overset{\|}{P}}XH$$

where R is a lower alkyl radical and X is a chalkogen of atomic weight less than 40 thereby forming a 2-butyne containing 1 chlorine substituent and 1 radical from the aforesaid acid.

11. A pesticidal composition suitable for application to living plants consisting essentially of a major proportion of an inert carrier non-toxic to plants and a minor but effective proportion as an essential active component thereof of a compound of the structure $$(RO)_2\overset{X}{\overset{\|}{P}}XCH_2C\equiv CCH_2Y$$

where R is a lower alkyl radical, X is a chalkogen of atomic weight less than 40 and Y is a member of the class of radicals consisting of chlorine and $$X\overset{X}{\overset{\|}{P}}(OR)_2$$

wherein X and R are as set forth above.

12. A method of protecting plants from insect pests which comprises treating the plant with a composition containing as an essential active ingredient a compound of the structure $$(RO)_2\overset{X}{\overset{\|}{P}}XCH_2C\equiv CCH_2Y$$

where R is a lower alkyl radical, X is a chalkogen of atomic weight less than 40 and Y is a member of the class of radicals consisting of chlorine and $$X\overset{X}{\overset{\|}{P}}(OR)_2$$

wherein X and R are as set forth above.

13. The process which comprises reacting substantially one molecular proportion of 1,4-dichlorobutyne-2 and substantially two molecular proportions of a salt of an acid having the structure $$(RO)_2\overset{X}{\overset{\|}{P}}-XH$$

where R is a lower alkyl radical and X is a chalkogen of atomic weight less than 40, thereby replacing both chlorines with a radical from the aforesaid acid.

References Cited in the file of this patent

UNITED STATES PATENTS 2,865,801    Baker et al. _____ Dec. 23, 1958

FOREIGN PATENTS 534,631    Canada _____ Dec. 18, 1956